Oct. 26, 1926.

H. K. SPENCER

MAGNETIC HOLDING DEVICE

Filed May 16, 1921  2 Sheets-Sheet 1

Inventor:
Henry K. Spencer
by Emery, Booth, Janney & Varney
Attys

Oct. 26, 1926.

H. K. SPENCER 1,604,323

MAGNETIC HOLDING DEVICE

Filed May 16, 1921    2 Sheets-Sheet 2

Inventor:
Henry H. Spencer.
by Emery, Booth, Janney & Varney,
Attys.

Patented Oct. 26, 1926.

1,604,323

UNITED STATES PATENT OFFICE.

HENRY K. SPENCER, OF WATERTOWN, MASSACHUSETTS, ASSIGNOR TO THE BLANCHARD MACHINE COMPANY, OF CAMBRIDGE, MASSACHUSETTS, A CORPORATION OF MASSACHUSETTS.

MAGNETIC HOLDING DEVICE.

Application filed May 16, 1921. Serial No. 470,193.

This invention relates to magnetic holding devices, and is more especially concerned with magnetic chucks for holding articles while work is being performed thereon. The invention aims to provide means for enabling the articles to be placed on the work support, carried toward the point where the work is to be performed, magnetically held when they reach a predetermined point in the travel of the work support, and released after the work has been performed, thereby enabling the work to be carried on continuously without the necessity of stopping the work support to reload the same from time to time.

The invention will be best understood by reference to the following description, when taken in connection with the accompanying drawings of one specific embodiment thereof, while its scope will be more particularly pointed out in the appended claims.

Figure 1:
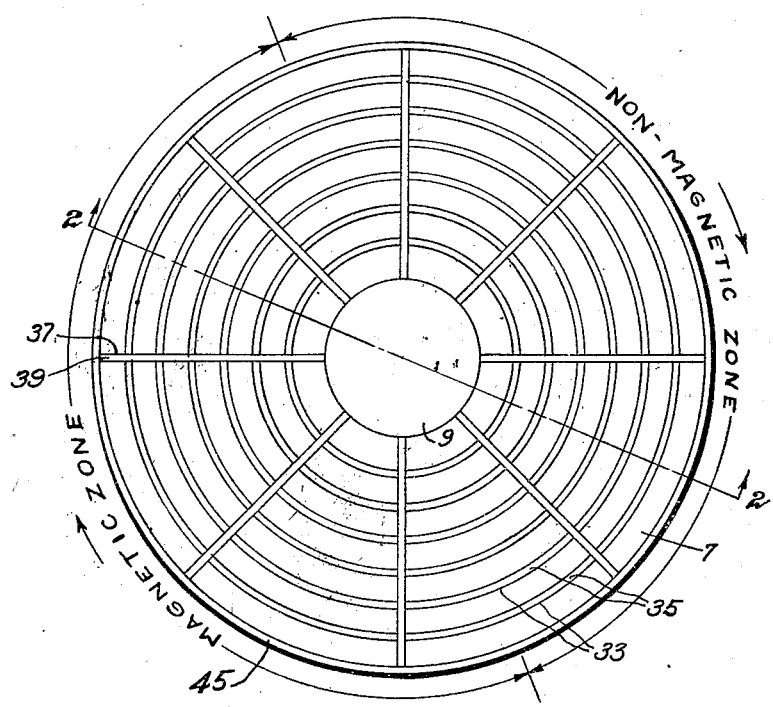
Fig. 1 is a plan of a magnetic holding device exemplifying my invention.

Referring to the drawings, and to the embodiment of the invention which is selected for exemplification, there is shown a magnetic chuck of the class exemplified by United States Letters Patent No. 1,125,198, issued to me January 19th, 1915, the same having a travelling work support 7 preferably formed of suitable magnetic material such as steel. In the present example, the motion of the work support is rotary, and herein it is carried by an upright spindle 9 which passes centrally therethrough, to which it may be conveniently secured as by providing the spindle with a shoulder 11, against which the work support is clamped by a ring 13 threaded onto the spindle. The spindle is mounted to turn in a suitable bearing 15, herein presented by a table 17. A collar 19, secured to the spindle below the bearing, holds the spindle against vertical displacement. The work support may be rotated by suitable mechanism, herein a ring gear 21 secured thereto and driven by a pinion 23.

In the operation of the machine, the pinion rotates the gear, and the latter turns the work support about a vertical axis, thereby carrying articles placed on the work support past the point where the work is to be performed. I will now describe the means whereby the work pieces are magnetically held when they reach a predetermined point in the travel of the work support, and are released after the work has been performed. The work support presents a chamber 25, which houses a series of magnetizing coils 27 disposed about the axis about which the work support rotates. Each of these coils is disposed about a core 29 conveniently formed as an integral part of the work support. A bottom plate 31 also formed of magnetic material such as steel is secured to the work support, and provides a closure for the bottom of the chamber, and in addition presents with the work support a continuous circuit for the magnetic flux. As in the aforesaid patent, some of the lines of force are diverted from the metallic circuit and compelled to flow through the pieces of work to be held by narrowing the path of the magnetic circuit adjacent the work surface of the chuck, as for example by providing the work support with a series of closely spaced concentric grooves 33, which may be and preferably are filled with rings 35 of suitable non-magnetic material such as brass. The spacing between the bottoms of these grooves and the top of the coil chamber is such that the effective cross section of the magnetic circuit is reduced above the chamber, and the greater part of the magnetic flux is compelled to flow between the grooves and through the parts to be magnetically held. These parts may be the pieces of magnetic work or non-magnetic pieces held in place by magnetic clamps, stops, or other holders.

Suitable provision is made for causing current to be supplied to the magnetizing coils in succession, as they pass a given point, and subsequently to discontinue the supply, thereby to create a magnetic zone in which the work is held in fixed position with reference to the travelling work support, and a non-magnetic zone in which the pieces to be worked upon can be moved about and positioned in preparation for the work, and afterwards removed from the work support when the work has been completed. One or more of the coils may be energized at one time thereby to present the desired relationship between the magnetic and non-magnetic zones. In the present example, each of these zones extends over 180°, and to this end, I have herein provided eight equally spaced coils, four of which are energized at one time. In order to confine the magnetic flux to the desired area, the chuck body is herein suitably slotted and grooved. In the present example, the face of the chuck body is provided with radial grooves 37, which may be filled with non-magnetic strips 39 to exclude foreign matter therefrom. The chuck body is further provided with two sets of radial slots 41 and 43 (see Fig. 3) to assist in the localization of the magnetic zone. These slots extend from the bottom of the chuck body up to the top of the chamber 25. It should therefore be evident from an inspection of Fig. 2 that there is comparatively little of the chuck body which presents a continuous annular connection between the segments formed by the described radial grooves and slots,—so little, in fact, that the magnetic leakage from one to the other is very slight. It is therefore apparent that the influence of the magnets will extend practically to only the chuck body segments with which they are associated. In other words, the magnetic zone is confined to the area which is adjacent to the magnets. When, therefore, the chuck body is rotated, and the work pieces are placed thereon, within the non-magnetic zone represented in Fig. 1, they may be moved about freely by the hands of the operative and properly positioned for the action of the work-performing means. Rotation of the chuck brings a procession of the work pieces successively into the magnetic zone represented in Fig. 1, and the pieces are immediately held in place on the chuck face. After the work has been performed, the pieces pass out of the magnetic zone into the non-magnetic zone, where they are released and can then be removed. As a means to prevent foreign matter from entering through the slots 41 into the chamber 25, and incidentally to strengthen the chuck body where it is thus cut away, I have herein provided a non-magnetic band or ring 45, which encircles the chuck body and is suitably secured thereto.

The provisions for energizing and de-energizing the coils will now be described, reference being had at first to Fig. 2. Suitably secured to the spindle 9 is a commutator or similar device, herein a drum 47 of insulating material which carries a set of contact segments 49 corresponding in number to the magnetizing coils, and connected respectively thereto (see Fig. 5), the angular extent of each segment depending upon the angular space which it is desired shall be embraced by the magnetic zone. The contact segments are placed in different angular positions about the commutator corresponding with positions of the respective coils to which they are connected. Connection is made with each of the moving segments by a relatively fixed brush 51, all of which brushes are connected to a lead wire 53, which in turn is connected to the positive terminal of a suitable source of current not shown.

Figure 2:
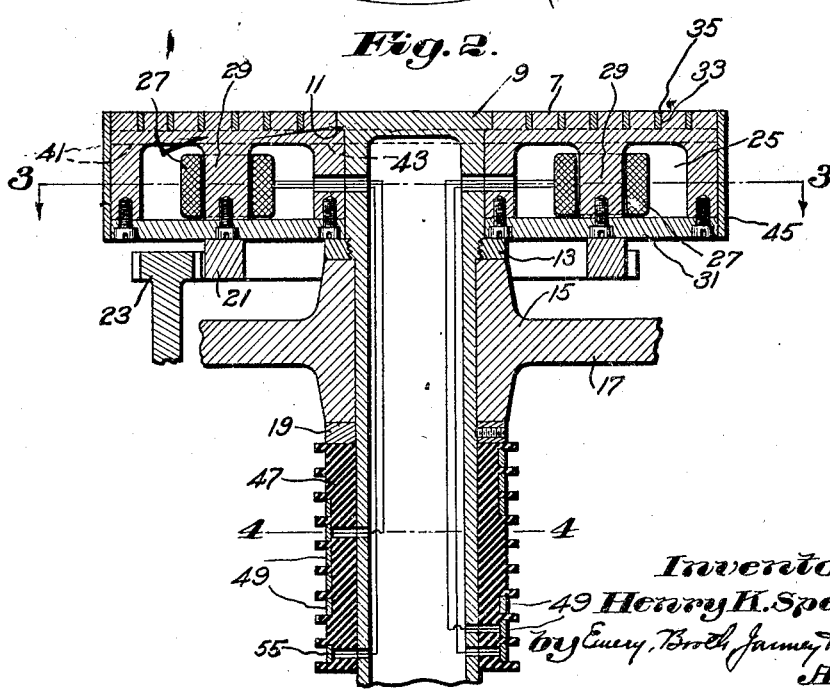
Fig. 2 is a sectional view on line 2—2 of Fig. 1.
Figure 3:
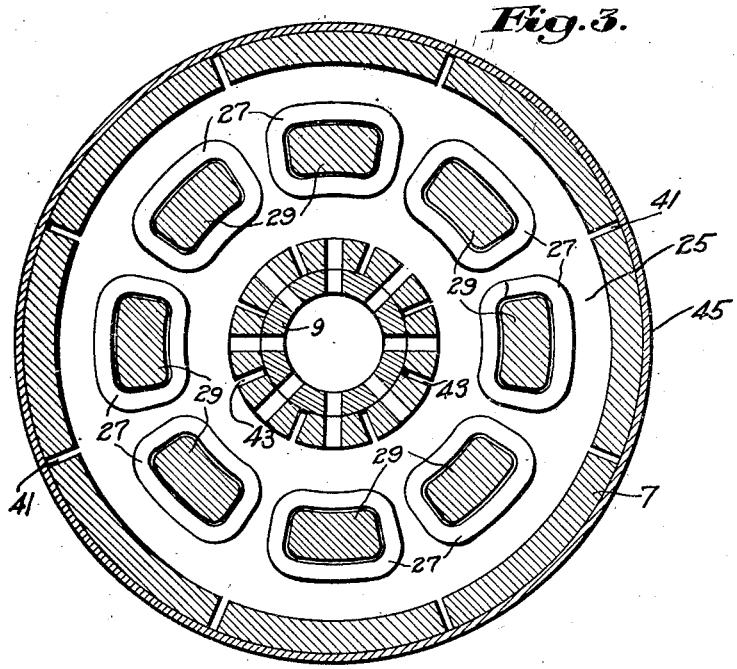
Fig. 3 is a sectional view on line 3—3 of Fig. 2.
Figure 4:
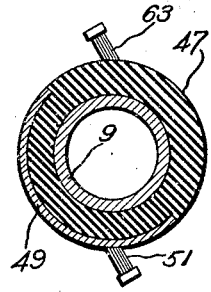
Fig. 4 is a sectional view on line 4—4 of Fig. 2.
Figure 5:
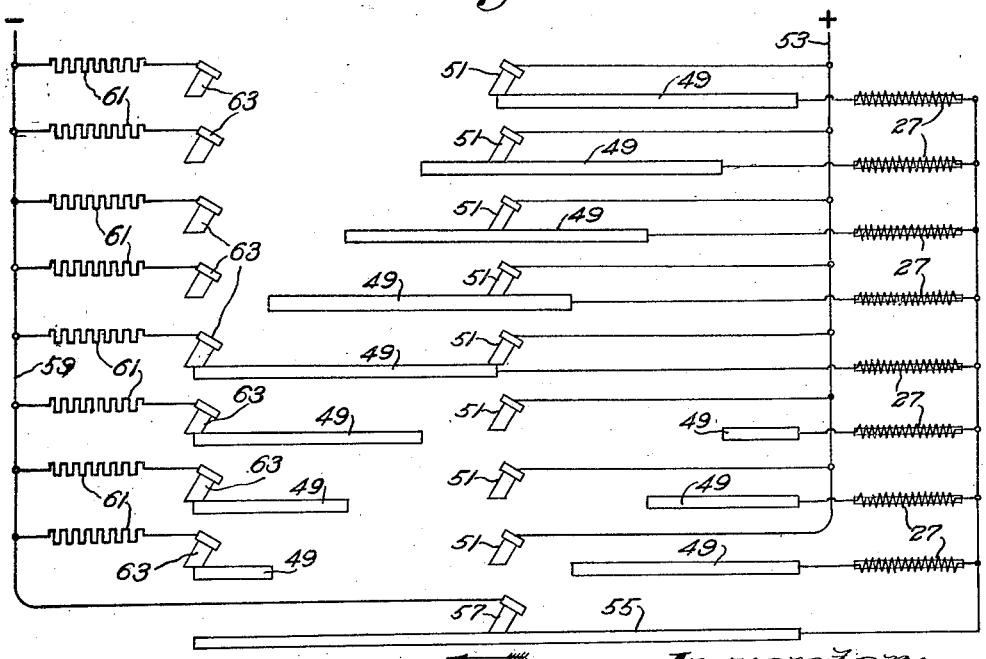
Fig. 5 is a wiring diagram.

The other terminal of each of the magnetizing coils is connected to a continuous contact ring 55, which is also carried by the insulating drum 49, as shown at the bottom of Figs. 2 and 5. This ring makes continuous contact with a brush 57, which is connected by a lead wire 59 to the negative terminal of the source of current. When, therefore, the work support is rotated, carrying with it the commutator, circuits are completed through each magnetizing coil, four of which are magnetized at the same time, and as the commutator continues to rotate and the magnetizing coils are carried in succession past a given point, they are successively energized and de-energized.

As each of the contact segments is leaving its brush, the induced current of the coil would cause severe sparking, and as a means to absorb the induced current and prevent sparking, I have provided a set of non-inductive resistances 61, connected to the negative lead wire 59 and to a set of brushes 63, which make contact with the respective segments just as the latter break contact with the brushes 51, as exemplified by the fifth segment from the top of Fig. 5. The non-inductive resistances may be placed at any convenient point. The wires from the segments to the coils may be conveniently carried through the spindle 9, which herein is hollow as shown in Fig. 2. The general operation of the device and the advantages which it presents should be evident without any further description.

Having thus described one embodiment of the invention, but without limiting myself thereto, what I claim and desire by Letters Patent to secure is:

1. In a magnetic holding device, the combination of a travelling work support having an upwardly presented surface on which the magnetic pieces to be held are placed, a series of magnetizing coils which are carried by said support below said surface in succession past a given point, and means for causing current to be supplied to said coils in succession as they reach such point and subsequently to discontinue said supply.

2. In a magnetic holding device, the combination of a travelling work support, a series of magnetizing coils which are carried by said support in succession past a given point, and means for causing current to be supplied to said coils in succession as they reach such point and subsequently to discontinue said supply, the last-mentioned means comprising relatively movable contacts, including a plurality of contacts carried by said work support and connected in parallel with said coils, respectively.

3. In a magnetic holding device, the combination of a travelling work support, a series of magnetizing coils which are carried by said support in succession past a given point, and means for causing current to be supplied to said coils in succession as they reach such point and subsequently to discontinue said supply, the last-mentioned means including two sets of relatively movable contacts, the contacts of one set being connected in parallel to said coils, respectively.

4. In a magnetic holding device, the combination of a travelling work support, a series of magnetizing coils which are carried by said support in succession past a given point, and means for causing current to be supplied to said coils in succession as they reach such point and subsequently to discontinue said supply, the last-mentioned means including two sets of relatively movable contacts, the contacts of one set being connected in parallel to said coils, respectively, and being carried by said work support.

5. In a magnetic holding device, the combination of a travelling work support, a series of magnetizing coils which are carried by said support in succession past a given point, and means for causing current to be supplied to said coils in succession as they reach such point and subsequently to discontinue said supply, the last-mentioned means including two sets of relatively movable contacts, one set comprising two contacts remaining in contact throughout the travel of said work support, one contact being carried by said work support and connected to all of said coils, and the other set comprising contacts mounted in fixed position and contacts carried by said work support into and out of contact with said fixed contacts, respectively, and connected to said coils, respectively.

6. In a magnetic holding device, the combination of a rotating work support presenting a series of magnetic portions disposed about the axis, and having a work-supporting surface perpendicular to said axis, a series of magnetizing coils carried by said support and associated with said magnetic portions, respectively, and means for causing current to be supplied to said coils successively as they reach a given place and subsequently to discontinue the supply.

7. In a magnetic holding device, the combination of a rotating work support presenting a series of magnet cores extending in the same general direction as the axis of said support and corresponding magnetic sectors connected therewith and disposed about the axis, said sectors presenting work-supporting surfaces generally perpendicular to said axis, a series of magnetizing coils about said cores, respectively, and means for causing current to be supplied to said coils successively as they reach a given place and subsequently to discontinue the supply.

8. In a magnetic holding device, the combination of a rotating work support, having a work-supporting surface perpendicular to the axis of said support, a series of magnetizing coils carried by and disposed about the axis of said support and adapted to attract magnetic objects lengthwise of said axis toward said surface, and means for causing current to be supplied to said coils successively as they reach a given place and subsequently to discontinue the supply, the last-mentioned means including relatively rotatable contacts, one carried by said work support.

9. In a magnetic holding device, the combination of a rotating work support, a series of magnetizing coils carried by and disposed about the axis of said support, and means for causing current to be supplied to said coils successively as they reach a given place and subsequently to discontinue the supply, the last-mentioned means including two sets of relatively movable contacts, the contacts of one set being overlapped circumferentially and being carried by said work support and connected in parallel to said coils, respectively, one or more of the contacts of one set being always in contact with part of the other set.

10. In a magnetic holding device, the combination of a rotating work support, a series of magnetizing coils carried by and disposed about the axis of said support, and means for causing current to be supplied to said coils successively as they reach a given place and subsequently to discontinue the supply, the last-mentioned means including two sets of relatively movable contacts, one set comprising two contacts remaining in contact throughout the rotation of said work support, one contact being carried by said work support and connected to all of said coils, and the other set comprising contacts mounted in fixed position and segmental contacts carried by said work support into and out of contact with said fixed contacts, respectively, and connected to said coils, respectively.

11. In a magnetic work-holding device, the combination of a series of electro-magnets disposed about an axis, a work support having a work-supporting surface generally normal to said axis, means for carrying said work support and said electro-magnets about said axis, and means for causing current to be supplied to said electro-magnets successively to cause them to attract magnetic objects toward said work-supporting surface in the direction of said axis and subsequently to discontinue the supply.

12. In a magnetic holding device, the combination of a travelling work support, a series of magnetizing coils which are carried by said support in succession past a given point, and means for causing current to be supplied to said coils in succession and subsequently to discontinue said supply, the last-mentioned means including a conductor to which said coils are individually and separately connected, and a plurality of relatively movable contacts including a set of contacts carried by said work-support and individually and separately connected to said coils, respectively.

13. In a magnetic holding device, the combination of a travelling work support, a series of magnetizing coils which are carried by said support in succession past a given point, and means for causing current to be supplied to said coils in succession and subsequently to discontinue said supply, the last-mentioned means including a conductor to which said coils are individually and separately connected, a plurality of relatively movable contacts including a set of movable contacts carried by said work-support, a set of fixed contacts adapted to contact therewith, and a conductor to which said fixed contacts are separately and individually connected, respectively.

14. In a magnetic holding device, the combination of a travelling work support, a series of magnetizing coils which are carried by said support in succession past a given point, and means for causing current to be supplied to said coils in succession and subsequently to discontinue said supply, the last-mentioned means including a conductor to which said coils are individually and separately connected, a plurality of relatively movable contacts including a set of movable contacts carried by said work-support, a set of fixed contacts adapted to contact therewith, a conductor to which said fixed contacts are separately and individualy connected, respectively, another set of fixed contacts adapted to contact with said movable contacts, a set of non-inductive resistances individually and separately connected with the last-mentioned fixed contacts, and a conductor to which said resistances are individually and separately connected.

15. In a magnetic holding device, the combination of a travelling work support, a series of magnetizing coils which are carried by said support in succession past a given point, and means for causing current to be supplied to said coils in succession and subsequently to discontinue said supply, the last-mentioned means including a conductor to which said coils are individually and separately connected, a plurality of relatively movable contacts including a set of movable contacts carried by said work-support, a set of fixed contacts adapted to contact therewith, a conductor to which said fixed contacts are separately and individually connected, respectively, another set of fixed contacts adapted to contact with said movable contacts, a set of non-inductive resistances individually and separately connected with the last-mentioned fixed contacts, a conductor to which said resistances are individually and separately connected, and two continuously contacting contacts connected to the first and last-mentioned conductors, respectively.

16. In a magnetic holding device, the combination of a travelling work-support, a series of magnetizing coils which are carried by said support in succession past a given point, and means for causing current to be supplied to said coils in succession as they reach such point and subsequently to discontinue said supply, the last-mentioned means comprising two sets of relatively movable contacts, one set connected in parallel with each other and the other set connected each in series with one of said coils, and said coils being connected in parallel with each other.

In testimony whereof, I have signed my name to this specification.

HENRY K. SPENCER.